A. C. BADGER.
CONTINUOUS DISTILLING APPARATUS.
APPLICATION FILED MAY 31, 1910.
1,082,064.
Patented Dec. 23, 1913.
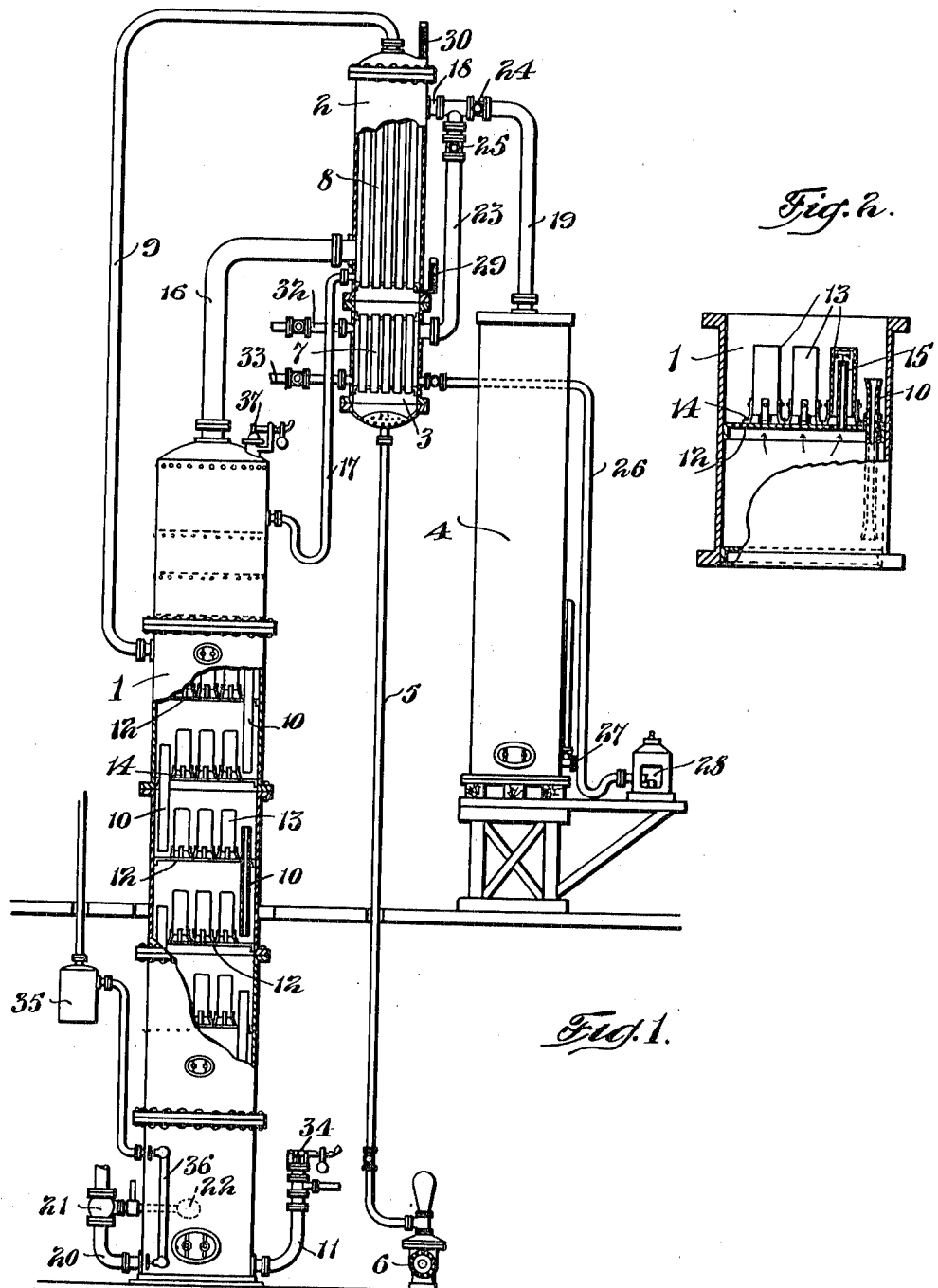

UNITED STATES PATENT OFFICE.

ARTHUR C. BADGER, OF NEWTON CENTER, MASSACHUSETTS.

CONTINUOUS DISTILLING APPARATUS.

1,082,064.   Specification of Letters Patent.   Patented Dec. 23, 1913.

Application filed May 31, 1910.   Serial No. 564,089.

*To all whom it may concern:*

Be it known that I, ARTHUR C. BADGER, of Newton Center, in the county of Middlesex and State of Massachusetts, have invented certain new and useful Improvements in Continuous Distilling Apparatus, of which the following is a specification.

This invention relates to an apparatus for distilling potable spirits by a continuous process, and has for its object to enable the proof and other qualities of the distilled product to be governed or regulated at will and at any desired time, independently of the quantity of liquor to be distilled, supplied to the apparatus, and of the temperature thereof.

A secondary object is to improve the process of distilling so that the organic esters, aldehydes and the like which give the so-called characteristic taste to distilled spirits may be produced with the spirit in the desired proportions.

In carrying my invention into effect I provide a heater through which the beer or mash to be distilled and the distilled product are both passed in heat-transferring relation, but out of direct physical contact with each other, whereby the incoming beer is heated and the outgoing vapors are partially condensed, and one important feature of my invention relates to the arrangement of the inlet and outlet for the vapor passing through this heater, whereby a better quality of spirit may be obtained than hitherto. I also provide an auxiliary heater through which the incoming beer is passed and in which the beer is heated at the expense of the otherwise waste heat of the distilled vapors, thus usefully employing this heat and economizing in the steam or other heating agent employed, while at the same time providing a means for regulating the proof and quality of the spirit finally delivered.

An apparatus suitable for the practice of my invention is illustrated in the accompanying drawings, in which, Figure 1 represents in elevation the embodiment of the invention which at the present time I consider preferable. Fig. 2 is an elevation partly in section of one of the sections of the column of the still.

The same reference characters indicate the same parts in all the figures.

The apparatus or still consists of four main elements, namely the column or evaporator in which the mash, or crude material, termed "beer," containing a relatively small proportion of alcohol is boiled and designated by the numeral 1, a heater 2, an auxiliary preliminary heater 3, and a condenser 4, which are connected with one another by piping. Leading to the preliminary or auxiliary heater 3 is a pipe 5 through which the beer or mash to be distilled is forced by a pump 6. The beer passes through tubes 7 in this heater into the main heater 2, passing through tubes 8 in the latter and thence through a pipe 9 into the upper part of the column 1, thence passing through overflow pipes 10 to the lower levels of the column. In the column it is boiled by steam or other heating fluid, forced in through the inlet pipe 11. The column is divided by horizontal partitions 12 into a number of chambers, each of which contains the beer at a level regulated by the height of the several overflow pipes 10. The heating agent is caused to pass through the beer in intimate relation therewith by means of the boiling caps 13, which, as appears from Fig. 2, are relatively long or high inverted cups, the rims of which are held at a distance above the floor of the chamber in which they are contained by foot pieces 14, and into which project pipes 15 which are open to the chamber below. The steam rising from each lower chamber passes through the pipes 15 into the interior of the caps, and being expelled from the latter below the beer level in each chamber, comes into intimate contact with the beer and subjects it to prolonged boiling. The steam and vapors from the lower levels of the column passing up through the successive chambers become more and more richly charged with the vaporized spirit until they pass from the top of the column through a pipe 16. The latter opens into the main heater 2 into the space surrounding the tubes 8, whereby the heated vapors are brought into intimate heat-transferring relation or thermal contact with the beer. The vapors having the highest boiling points are condensed by the cool beer in the tubes 8 and fall to the bottom of the heater, whence they flow through a pipe 17 into the uppermost chamber of the still. Such vapors, having lower boiling points, as are not condensed in the heater pass out of the outlet 18 and through a pipe 19 into the condenser 4, wherein they are finally condensed in the usual manner. The topmost part of the column 1 is divided by partitions similar to those shown at 12 into three or more chambers which receive the condensate from the main heater before the latter passes to the lower part of the column and mingles with the beer admitted to the pipe 9. The condensate in the top of the column, containing a higher percentage of spirit than the beer, is thus continually redistilled before mingling with the beer. At the bottom of the column is an outlet pipe 20 in which is a valve 21 controlled by a float 22 within the column. When the liquid level in the bottom chamber is sufficiently high the float in rising opens the valve 21 and the liquid is allowed to escape. Thus the beer is continually admitted to the column, is subjected to a continuous boiling action until the spirit is all extracted, and finally, without its alcoholic contents, is withdrawn from the bottom of the column.

A branch pipe 23 leads from the pipe 19 into the auxiliary heater 3 so that a portion of the distilled spirits, the quantity of which is regulated by the valves 24 and 25 in the pipes 19 and 23 respectively, is admitted to the space in the auxiliary heater surrounding the tube 7. Thereby this spirit is allowed to expend its heat in warming the incoming beer before the latter passes to the main heater. The spirit passes thence through a pipe 26 with which also is connected the outlet 27 from the condenser and the product is finally delivered at the point 28.

In the foregoing description I have named the heating agent as being steam, which is caused to pass directly through the incoming beer in the column, but I desire it to be understood that I do not limit myself to this particular heating agent or the manner in which its heat is delivered to the beer, but I may employ any of the other modes now commonly used in continuous or intermittent stills for evaporating the spirituous part of the beer.

From the foregoing description of the construction and mode of operation of my distilling apparatus it will be understood that the incoming beer is warmed in the main heater at the expense of the heat of the distillate and that thereby a portion of the distillate is condensed and allowed to return into the still. Hitherto there has been no means for regulating the amount of heat thus extracted from the distillate, and the quality of the vapors finally delivered to the condenser. By reason of my invention, in which an auxiliary heater is employed wherein the beer is given a preliminary heating by the heat of the distilled product after the same has passed out of the main heater, it is possible to give such a temperature to the incoming beer before it reaches the main heater that either high or low proof spirits may be obtained at will and in exactly the degree required, and also that the desired portion of esters and other ingredients which give the characteristic taste to rum, whisky and other potable spirits, may be retained in the distilled liquid. It should be noted that these esters are condensed at a higher temperature than alcohol, and that therefore if the distillate is cooled to too low a degree in the main heater 2 they will be condensed out of the spirit, which will thus be deprived of the desired qualities. Furthermore high or low proof spirits may be obtained by respectively diminishing or increasing the amount of heat which is given to the beer in the auxiliary heater, for, as will be readily seen, if the beer is highly heated before it comes into the main heater, the higher proof spirits will not be condensed in the latter, while if it is comparatively cool, the higher proof spirits will be therein condensed. The preheating of the beer involves no additional expense, for the heat carried away by the vapors passing out of the main heater is otherwise useless, and in the ordinary course would be abstracted by the cooling water in the condenser and lost. Consequently whatever of this heat is utilized in first warming the beer is an economic gain. The temperature of the beer in the two heaters is determined by the thermometers 29 and 30 respectively, by which the amount of vapor necessary to be diverted to the preliminary heater for any special purpose may be seen, the amount thus diverted being controlled by the valves 24 and 25. It is possible also to heat the beer preliminarily otherwise than by the heat of the distilled vapors, and for this purpose I provide means for admitting steam to the auxiliary heater in the spaces surrounding the tubes 7, a pipe 32 being provided for the incoming steam and an exhaust pipe 33 for the outgoing steam and condensate. Thus by means either of the heat contained in the vapors of the distilled product, or by the heat of the steam admitted as described, the quality and proof of the spirit finally delivered may be exactly regulated at the will of the operator independent of the temperature and quantity of crude material being introduced into the still. It will thus be evident that spirit of any, and of extraordinary, qualities may be obtained from a still improved in accordance with my invention, the quality not only being that indicated by the proof of the spirit, but also by the presence of more or less of the organic esters and other substances which give the so-called taste to the spirit. To the best of my knowledge such qualities have never hitherto been obtainable from a continuous still and certainly it has not been possible hitherto to control absolutely, and vary, the quality of the product at any desired time in the course of operation of the still, independent of the amount or quality of the crude material being introduced into the still.

Another important improvement which is embodied in my present invention consists in the arrangement of the vapor inlet and outlet to and from the main heater. In this invention the vapor inlet pipe opens into the lower part of the heater, while the outlet pipe is at the upper part thereof. In this way the spirits condensed from the vapor approaching the outlet, which, in accordance with the equilibrium alcohol constituent of such vapor, will be stronger in alcohol than that condensed from the entering vapors, will meet these ascending entering vapors as the liquids fall to the bottom of the apparatus. In this way the incoming vapors are continuously enriched by the higher alcoholic contents of the descending liquids and a more efficient separation of the high proof vapors from the low proof vapors than has been possible in the stills as previously known, is effected. Thus a more efficient separation of the low proof from the high proof spirits is effected and products of higher proof may be obtained. In other respects the apparatus is similar to continuous stills now in use, and it has the usual accessories such as the safety valve 34, pressure indicator vessel 35, gage glass 36 and vacuum valve 37 at the top of the column.

I claim,—

1. A distilling apparatus comprising an evaporator to which mash is admitted and from which vapors of distillation issue, and means for shunting any desired proportion of the outcoming vapor into thermal contact with the incoming mash.

2. A distilling apparatus comprising in combination an evaporator, a heater through which the incoming mash and the outgoing vapor from said evaporator pass in thermal contact and from which uncondensed vapor issues, and means for passing a regulated proportion of such vapor into thermal contact with the mash before the latter passes to the said heater.

3. A distilling apparatus comprising an evaporator, a plurality of heaters through which the crude material to be distilled passes in coming to said evaporator, means for passing vapors issuing from the evaporator through one of said heaters in thermal contact but out of physical contact with the incoming mash, means for returning to the evaporator the liquid condensed from such vapors in such heater, means for conducting uncondensed vapors from said heater, and means for shunting any desired proportion of the vapors issuing from said heater through another heater through which the mash passes before reaching the first named heater.

4. A distilling apparatus and means for regulating the qualities and proof of the final product thereof, comprising an evaporator, means for effecting a thermal contact between the vapors of distillation and the incoming crude material and thereby condensing a part of such vapors, a heater through which the crude material passes before reaching said thermal contact means, and means for passing a regulated proportion of the vapor passing from said thermal contact means through said heater in thermal contact with the crude material, whereby such material is heated to a desired extent before coming into thermal contact with the vapors issuing from the evaporator.

In testimony whereof I have affixed my signature, in presence of two witnesses.

ARTHUR C. BADGER.

Witnesses:
C. F. BROWN,
P. W. PEZZETTI.